UNITED STATES PATENT OFFICE.

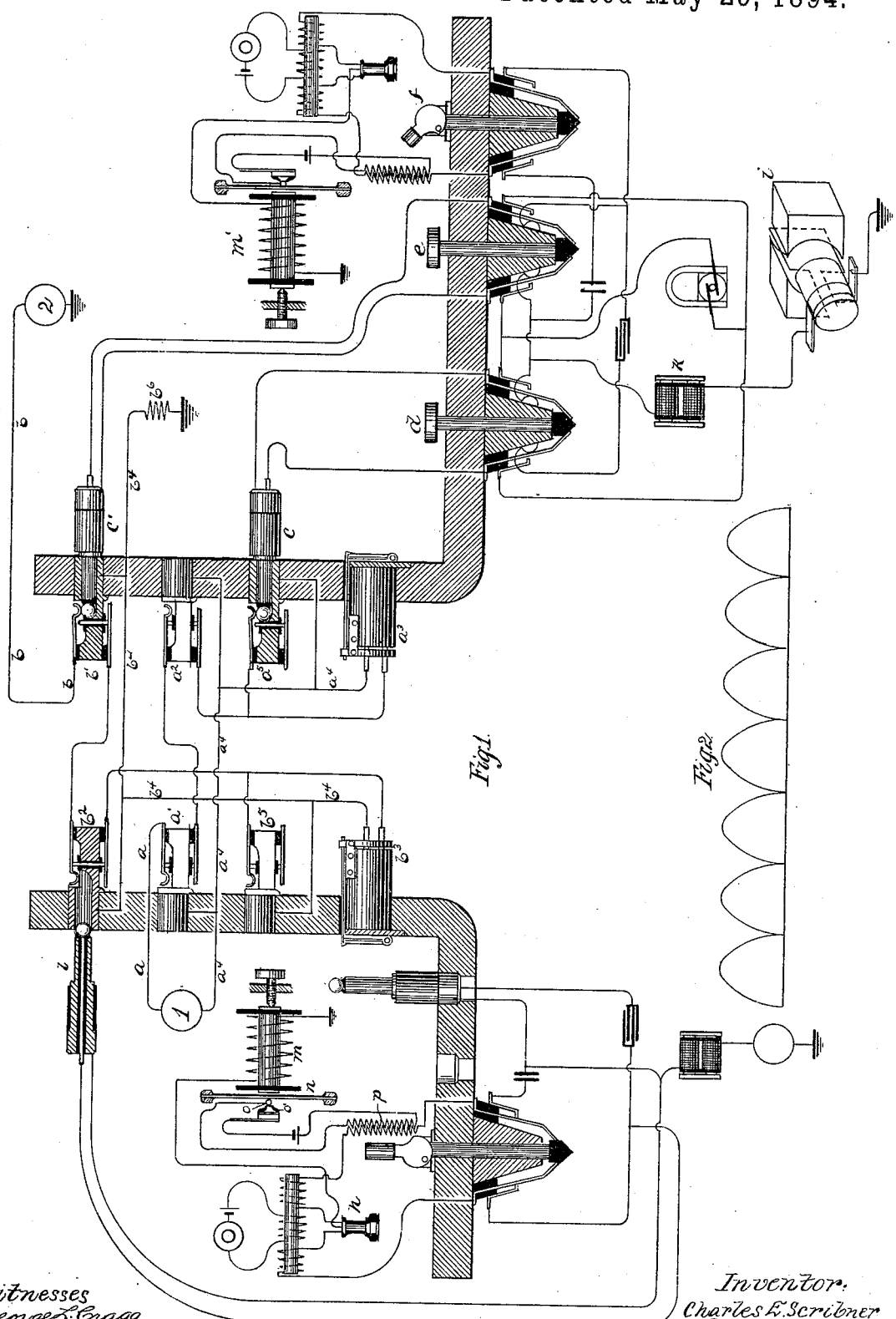

CHARLES E. SCRIBNER, OF CHICAGO, ILLINOIS, ASSIGNOR TO THE WESTERN ELECTRIC COMPANY, OF SAME PLACE.

TESTING SYSTEM FOR MULTIPLE SWITCHBOARDS.

SPECIFICATION forming part of Letters Patent No. 520,543, dated May 29, 1894.

Application filed August 24, 1891. Serial No. 403,585. (No model.)

*To all whom it may concern:*

Be it known that I, CHARLES E. SCRIBNER, a citizen of the United States, residing at Chicago, in the county of Cook and State of Illinois, have invented a certain new and useful Improvement in Testing Systems for Multiple Switchboards, (Case No. 249,) of which the following is a full, clear, concise, and exact description, reference being had to the accompanying drawings, forming a part of this specification.

My invention relates to testing apparatus for multiple switch board systems. Its object is to provide a test signal of such a character as to be readily distinguishable from false signals produced by accidental and extraneous causes.

My invention comprises circuits and apparatus whereby a pulsating electro motive force is impressed upon the connected series of test rings of the spring jacks of a telephone line when a connection is made to the line; and a testing plug adapted to complete a circuit including the source of electro motive force which includes also in the circuit a device adapted to respond to the pulsating current and to produce a sound in the telephone of the operator making the test, but which shall not be responsive to any approximately continuous current such as may come upon the line accidentally from external sources. The said responsive device I construct as a transmitter having a diaphragm of magnetic material; near the diaphragm with its pole presented so close thereto that the diaphragm shall strike the pole when attracted thereby, I place an electro magnet whose coil is included in circuit with the test plug. The contacts of the transmitter are included in a local circuit which includes also a battery and a coil adapted to act inductively upon the circuit of the telephone of the operator to whose outfit the test plug belongs. The coil of the local circuit may be either the primary of a separate induction coil whose secondary is included in the circuit of the telephone, or a second primary in the induction coil of the operator's transmitter. The source of pulsating electro motive force may be a dynamo giving pulsations of constant direction and of such a period that the separate pulsations do not blend into a tone in a telephone included in the circuit and of such a character that no sound shall be produced by the fluctuation of the current. This source of electro motive force is included in a branch connection extending from earth to the conductor joining the sleeves of the pair of connecting plugs. Hence when a connection is made to a line by means of this pair of connecting plugs, the sleeve, coming in contact with the frame of the spring jack into which it is thrust, connects the source of electro motive force to the series of test rings of the line. When an operator at another board desires to determine whether the line is or is not in use, she applies her testing plug to the test ring or frame of the spring jack of that line at her board, and the circuit of the source of pulsating electro motive force is completed from the frame of the spring jack tested, through the coil of the responsive device; the electro magnet attracts the diaphragm of the microphone and causes it to strike the presented pole of the magnet at each pulsation of current. The blows affect the transmitter contacts and thus cause variations in the local circuit of the transmitter which are induced upon the telephone circuit through the medium of the induction coil and causes a characteristic sound in the telehone. A constant current in the telephone line escaping through the test plug to earth would cause only a single click in the testing operator's telephone.

My invention will be more readily understood by reference to the accompanying drawings, which are illustrative thereof.

In Figure 1 of the drawings I have shown two substations connected to their respective spring jacks and annunciators on two sections of multiple switch board. The switch boards are shown equipped with the usual apparatus for connecting, calling and communicating with subscribers. It comprises a pair of connecting plugs joined by conductors, calling keys included in circuit between the plugs and a listening key in a branch connection between the two contact pieces of the plugs. At the second board, at the right of the drawings, I have shown a dynamo included in a branch connection extending from earth to the conductor joining the sleeves of the connecting plugs. At the first section of switch board, at the left of the drawings, I have shown the operator's testing plug and the responsive device, but have omitted from the key board circuits the calling keys in order to avoid confusion of the drawings. To prevent the generator of pulsatory currents at one board affecting the responsive device thereat, a condenser of small capacity is placed in the bridge containing the operator's telephone set, thus preventing the passage of sufficient current through the responsive device, to actuate the same.

In Fig. 2 I have shown a graphic representation of the character of the electro motive force or current from the dynamo.

Having thus generally described the system shown in the drawings I will now proceed to describe in greater detail and to trace the various operations of establishing communication between two substations by means thereof.

The station 1 is connected to the exchange by a metallic circuit; its circuit may be traced over line $a$, through the line spring and contact of spring jack $a'$ at the first board, thence to the line spring and contact of spring jack $a^2$ at the second board, thence through the annunciator $a^3$ and thence returning by line $a^4$ to substation 1. The line $a$ is connected to the line spring of an answering jack $a^5$ at the second board; the line $a^4$ is connected to the frames of the spring jacks $a'$ $a^2$ $a^5$. The circuit from station 2 is grounded; it may be traced over line $b$, through the line springs and contacts of spring jacks $b'$ and $b^2$ and thence through annunciator $b^3$ to conductor $b^4$, thence through resistance $b^6$ to earth. The line spring of an answering jack $b^5$ at the first board is connected to the line $b$ and the frame to the line $b^4$.

The operator's outfit comprises the plugs $c$ and $c'$ each having two contact pieces, one of which is adapted to come into contact with the line spring and the other with the frame or test ring of a spring jack into which it is inserted. The corresponding contact pieces of the plugs are electrically connected, the tips through a condenser and the sleeves directly. The calling keys $d$ and $e$ are included in circuit between the two plugs, one on each side of the condenser, and are provided with contacts, whereby they are adapted to disconnect both contact pieces of either one of the plugs from those of the other and to connect them to the two poles of a calling generator when depressed. Branch connections are extended from the two conductors joining the two plugs to the contacts of the listening key $f$; other contacts are provided on the listening key, whereby when the cam is thrown into its vertical position, the operator's telephone set $h$ is included in a branch connection between the two different contact pieces of the two plugs, and hence between the two sides of the circuit of two subscribers in communication. A dynamo $i$ is included in a branch circuit from the conductor joining the sleeves of the connecting plugs. In practice a retardation coil $k$ is included in the same branch circuit between the dynamo and the sleeve of the connecting plug in order that several branch connections to different pairs of connecting cords may be extended from the same dynamo.

At the first board the operator's testing plug $l$ is shown in the position of making a test. The circuit from the test plug to earth includes the coil $m$ of the electro magnet of the responsive device. $n$ is the diaphragm of the responsive device; $o$ and $o'$ the transmitter contacts bearing against the diaphragm; these are included in the local circuit of a battery and the primary of the induction coil $p$, whose secondary is included in the circuit of the operator's telephone set $h$.

I will now describe the operations of connecting two subscribers and of my improved testing system in connection with the switch board apparatus shown. Suppose, for example, that subscriber at station 1 desires to communicate with subscriber at station 2; he operates his calling magneto, the current from which, flowing over the lines and through the annunciator $a^3$, causes the shutter of the annunciator to fall, and thus the operator is notified that a connection is desired; she inserts her answering plug $c$ into the answering jack $a^5$ of line of station 1 and throws the lever of her listening key $f$ into its vertical position, whereby the circuit from station 1 is extended from the spring jack $a^5$, through the contact pieces of the plug $c$, through the contacts of listening key $f$ to the operator's telephone set $h$ and the subscriber and operator are in communication. The operator having learned with what station the connection is desired proceeds to test the spring jack of that line at her board to determine whether the lines are already in use at some other section of switch board or not; this operation of testing may be traced by reference to the testing apparatus at the first section of switch board. The testing operator applies the tip of testing plug $l$ to the test ring of a spring jack of the line to be tested. The branch circuit from earth is thus extended to the test ring of the lines tested, but if the line be a metallic circuit no other connection exists to earth, and hence no response would be caused in the responsive device $m$. If the line be a grounded circuit the connection does exist at some point to earth, but no source of electricity is included in the circuit; if an induced or strong current should exist in the line the responsive device would give no more than a single click at each making and breaking of the connection between the testing plug and the test ring of the spring jack; if, however, the lines be in use as shown in the drawings a connection already exists from the connected series of test rings of the line to earth including the source of pulsating electro motive force, and when the circuit is completed by the application of the testing plug to the test ring of the spring jack a pulsating current flows in the test circuit. At each pulsation of current the diaphragm $n$ of the responsive device is attracted to the pole of the magnet $m$ and strikes against it, producing a click or equivalent sound in the telephone of the testing operator, and the rapid succession of clicks is characteristic of a test of a line already in use. The operator hearing such a sound in her telephone is certain that the sound was produced by no other cause than the completion of the testing circuit.

Having thus described my invention, I claim as new and desire to secure by Letters Patent—

1. In combination, an electrically connected series of test rings of spring jacks, a branch connection from one test ring to earth including a source of pulsating electro motive force, a branch connection from another of the test rings to earth including a coil of an electro magnet, a transmitter provided with a diaphragm adapted to be attracted to and to strike against the pole of the magnet and with contacts included with a battery and a coil adapted to act inductively upon the circuit of the operator's telephone, substantially as and for the purpose specified.

2. A test circuit for multiple switch boards including a source of pulsating electro motive force of such character as not to be audible in a telephone included in its circuit, in combination with an electro magnet included in the test circuit adapted to cause the diaphragm of a telephone transmitter to vibrate against said magnet when energized, said transmitter being included in a local circuit with a battery and a coil adapted to act inductively upon the circuit of the operator's telephone, and conductors completing the test circuit, substantially as and for the purpose specified.

3. As a responsive device for test circuits of multiple switch boards, an electro magnet having a coil included in the test circuit, in combination with a transmitter having a diaphragm of magnetic material adapted to vibrate against the pole of said magnet, the contacts of said transmitter being included in a local circuit with a battery and a coil adapted to act inductively upon the circuit of a telephone, substantially as and for the purpose described.

In witness whereof I hereunto subscribe my name this 15th day of July, A. D. 1891.

CHARLES E. SCRIBNER.

Witnesses:
GEORGE L. CROGG,
EDITH M. ARNOLD.